US 9,852,355 B2

(12) United States Patent
Couleaud et al.

(10) Patent No.: US 9,852,355 B2
(45) Date of Patent: Dec. 26, 2017

(54) FACIAL ANALYSIS FOR VEHICLE ENTERTAINMENT SYSTEM METRICS

(71) Applicant: Thales Avionics, Inc., Irvine, CA (US)

(72) Inventors: Jean-Yves Couleaud, Mission Viejo, CA (US); Tracy DeCuir, Yorba Linda, CA (US)

(73) Assignee: THALES AVIONICS, INC., Irvine, CA (US)

( * ) Notice: Subject to any disclaimer, the term of this patent is extended or adjusted under 35 U.S.C. 154(b) by 0 days.

(21) Appl. No.: 14/691,854

(22) Filed: Apr. 21, 2015

(65) Prior Publication Data
US 2016/0316237 A1 Oct. 27, 2016

(51) Int. Cl.
| | |
|---|---|
| *H04N 7/18* | (2006.01) |
| *G06K 9/62* | (2006.01) |
| *H04N 21/4223* | (2011.01) |
| *H04N 21/258* | (2011.01) |
| *H04N 21/214* | (2011.01) |
| *H04N 21/2668* | (2011.01) |
| *H04N 21/442* | (2011.01) |
| *G06K 9/20* | (2006.01) |
| *G06K 9/00* | (2006.01) |
| *H04N 21/466* | (2011.01) |

(52) U.S. Cl.
CPC ....... *G06K 9/6201* (2013.01); *G06K 9/00604* (2013.01); *G06K 9/2018* (2013.01); *G06K 9/2027* (2013.01); *H04N 21/2146* (2013.01); *H04N 21/25883* (2013.01); *H04N 21/2668* (2013.01); *H04N 21/4223* (2013.01); *H04N 21/44218* (2013.01); *G06K 9/0061* (2013.01); *G06K 9/00302* (2013.01); *G06K 2009/00322* (2013.01); *H04N 21/4667* (2013.01)

(58) Field of Classification Search
CPC ............ H04N 21/214; H04N 21/2146; H04N 21/42202; H04N 21/44218
USPC ....................................... 725/75–77
See application file for complete search history.

(56) References Cited

U.S. PATENT DOCUMENTS

| | | | | |
|---|---|---|---|---|
| 2005/0264425 | A1* | 12/2005 | Sato ....................... | G08B 31/00 340/573.1 |
| 2006/0184800 | A1* | 8/2006 | Rosenberg .............. | G06F 21/32 713/186 |
| 2010/0027836 | A1* | 2/2010 | Sakurada ........... | G06K 9/00664 382/100 |

(Continued)

*Primary Examiner* — Kyu Chae
(74) *Attorney, Agent, or Firm* — Sage Patent Group

(57) ABSTRACT

A vehicle entertainment system includes a video display unit, a camera, a communication interface, and a processor. The video display unit provides content to a user. The camera outputs a camera signal containing data representing the user's face. The communication interface communicate with a central content usage analysis computer. The processor processes the camera signal to identify facial features, compares the facial features to defined demographics rules, identifies user demographics based on the comparison of the facial features to the defined demographics rules, correlates the user demographics to a timeline of content consumed by the user through the video display unit to generate enhanced content usage metrics, and communicates the enhanced content usage metrics through the communication interface for delivery to the central content usage analysis computer.

15 Claims, 7 Drawing Sheets

(56) References Cited

U.S. PATENT DOCUMENTS

| | | | | |
|---|---|---|---|---|
| 2010/0328492 A1* | 12/2010 | Fedorovskaya | G06Q 30/02 | 348/231.2 |
| 2011/0134026 A1* | 6/2011 | Kang | G06F 3/00 | 345/156 |
| 2011/0219407 A1* | 9/2011 | Margis | H04N 7/163 | 725/75 |
| 2012/0075122 A1* | 3/2012 | Whitlow | A61B 5/18 | 340/963 |
| 2012/0083668 A1* | 4/2012 | Pradeep | A61B 5/04015 | 600/300 |
| 2012/0222058 A1* | 8/2012 | el Kaliouby | H04N 21/251 | 725/10 |
| 2013/0063340 A1* | 3/2013 | Mondragon | G09G 5/00 | 345/156 |
| 2014/0156301 A1* | 6/2014 | Craine | G06F 19/3493 | 705/2 |
| 2014/0207559 A1* | 7/2014 | McCord | G06Q 30/0242 | 705/14.41 |
| 2014/0237400 A1* | 8/2014 | Higgins | G06F 3/048 | 715/765 |
| 2014/0278910 A1* | 9/2014 | Visintainer | G06Q 30/0242 | 705/14.41 |
| 2014/0310739 A1* | 10/2014 | Ricci | H04W 48/04 | 725/28 |
| 2014/0335497 A1* | 11/2014 | Gal | G09B 7/00 | 434/323 |
| 2015/0070516 A1* | 3/2015 | Shoemake | H04N 21/42203 | 348/207.11 |
| 2015/0135285 A1* | 5/2015 | Boro | H04L 29/06 | 726/5 |
| 2015/0235084 A1* | 8/2015 | Cho | A61B 3/113 | 345/581 |
| 2015/0239561 A1* | 8/2015 | Hau | B64D 11/00 | 715/771 |
| 2015/0312639 A1* | 10/2015 | Hoctor | H04N 21/482 | 725/42 |

* cited by examiner

Enhanced Content Usage Metrics

| Content 1 Consumption Timeline | Other Content Having Time Overlap | Passenger Demographics Information | Passenger Emotion | Passenger Attentiveness | Passenger Eye Viewing Locations |
|---|---|---|---|---|---|
| Scene 1, Time Range 1 | Advertisement 1 | Age range 40-50, Male, Caucasian,... | Smiling | Score 8 | Shifted from Content 1 to Advertisement 1 and maintained for duration of Ad. |
| Scene 1, Time Range 2 | Advertisement 2 | Age range 40-50, Male, Caucasian,... | Neutral | Score 6 | Maintained on Advertisement 2 for 4 sec. then to Content 1 |
| ... | | | | | |
| Scene 2, Time Range 1 | | Age range 40-50, Male, Caucasian,... | Laughing | Score 10 | Maintained on Content 1 for duration |
| ... | | | | | |
| Scene 3, Time Range 1 | Arrival airport and destination information | Age range 40-50, Male, Caucasian,... | Boredom | Score 3 | Maintained on arrival airport and destination info. for 3 minutes, remainder on Content 1 |
| ... | | | | | |
| Scene n, Time Range y | Advertisement Y | Age range 40-50, Male, Caucasian,... | Sleeping | Score 0 | None |

*FIGURE 4*

FACIAL ANALYSIS FOR VEHICLE ENTERTAINMENT SYSTEM METRICS

TECHNICAL FIELD

Embodiments described herein relate generally to electronic entertainment systems and, more particularly, to man-machine interfaces for controlling vehicle and other entertainment systems and generating metrics from use of vehicle and other entertainment systems.

BACKGROUND

In-flight entertainment (IFE) systems are deployed onboard aircraft to provide entertainment for passengers in a passenger cabin. IFE systems typically provide passengers with television, movies, games, audio entertainment programming, and other content.

IFE systems can provide video-on-demand services to passengers from a library of content made available by the airline or another entity associated with the airline (i.e., a content service provider). Selection of content to be included or maintained within an IFE system can be a difficult but important process. Passenger satisfaction with a flight experience and, ultimately, with an airline can be significantly impacted by what content is made available through an IFE system.

Content is presently selected for IFE systems based on box office ratings, TV ratings, and "usage data" captured by IFE systems. Usage data indicates particular content that was used by passengers during earlier flights. Usage data can provide a relatively limited understanding of content usage, such as the number of times and duration content was viewed during various flights.

SUMMARY

Some embodiments of the present disclosure are directed to a vehicle entertainment system that includes a video display unit, a camera, a communication interface, and a processor. The video display unit provides content to a user. The camera outputs a camera signal containing data representing the user's face. The communication interface communicates with a central content usage analysis computer. The processor processes the camera signal to identify facial features, compares the facial features to defined demographics rules, identifies user demographics based on the comparison of the facial features to the defined demographics rules, correlates the user demographics to a timeline of content consumed by the user through the video display unit to generate enhanced content usage metrics, and communicates the enhanced content usage metrics through the communication interface for delivery to the central content usage analysis computer.

Some other embodiments of the present disclosure are directed to a vehicle entertainment system that includes a video display unit, a camera, a communication interface, and a processor. The video display unit is mounted to a seat and provides content to a user. The camera outputs a camera signal containing data representing the user's face. The communication interface communicate with a central content usage analysis computer. The processor processes the camera signal to identify facial features, compares the facial features to defined emotion rules, identifies a user emotion based on the comparison of the facial features to the defined emotion rules, generates a profile of the user emotions repetitively identified over time, compares the profile of the user emotions to a defined alert rule, and communicates an alert message to an electronic terminal having a defined network address responsive to the defined alert rule being satisfied by the comparison.

Other video display units, vehicle entertainment systems, and methods according to embodiments of the invention will be or become apparent to one with skill in the art upon review of the following drawings and detailed description. It is intended that all such additional video display units, vehicle entertainment systems, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings:

FIG. 4 is an example data structure containing enhanced content usage metrics according to some embodiments;

DETAILED DESCRIPTION

The following detailed description discloses various non-limiting example embodiments of the invention. The invention can be embodied in many different forms and is not to be construed as limited to the embodiments set forth herein.

Various embodiments of the present disclosure may arise from the present realization that content usage data generated by In-Flight Entertainment (IFE) systems provides an unsatisfactorily level of understanding of how passengers consume and perceive content provided by the IFE systems. To overcome these and other problems, some embodiments of the present invention are directed to providing an IFE system that is configured to determine passenger demographics which are then correlated to content usage statistics, and is further configured to analyze how appealing the content was to those passengers when consumed. Consumption of content can include viewing the content (e.g., movie, TV program, textual information, informational video), running an application program (e.g., game), listening to audio programming, etc.

Figure 1:
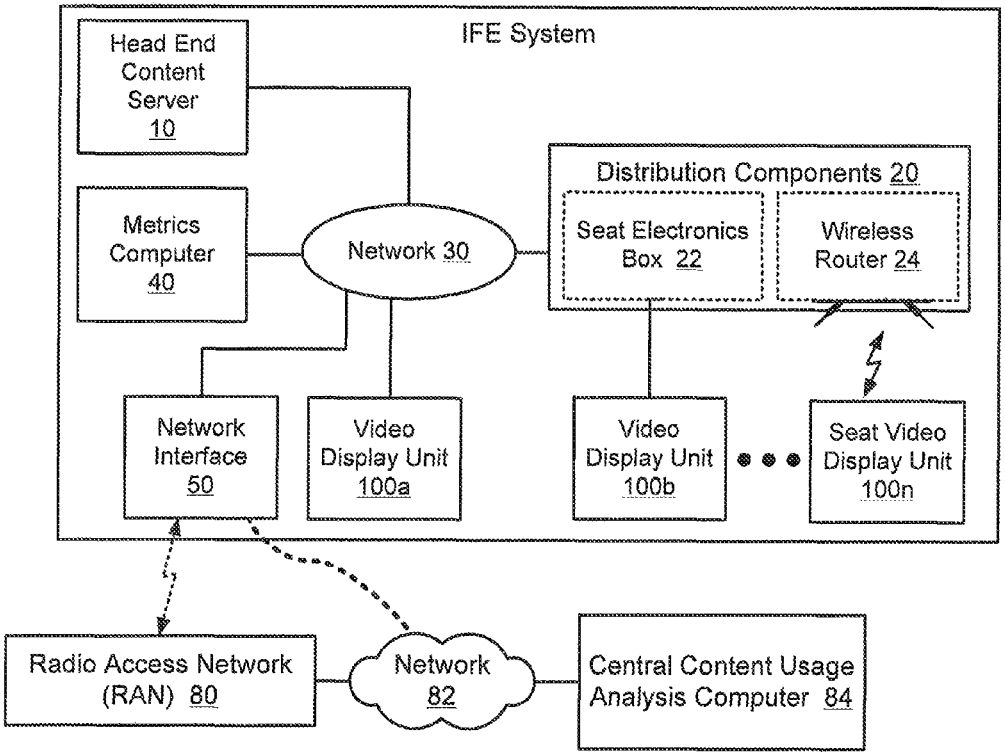
FIG. 1 illustrates a block diagram of an in-flight entertainment system that generates enhanced content usage metrics which are communicated off-board to a central content usage analysis computer according to some embodiments.

FIG. 1 is a block diagram of an IFE system that includes video display units (VDUs) 100a-n, a head end content server 10, and distribution components 20. The system further includes a metrics computer 40 that may receive and combine enhanced content usage metrics generated by the VDUs 100a-n. In some other embodiments the metrics computer 40 receives information from the VDUs 100a-n that characterizes passengers, which the metrics computer 40 uses to generate enhanced content usage metrics. The enhanced content usage metrics identify one or more of: passenger demographics; passenger emotions; passenger attentiveness; passenger eye viewing locations; and other tracked passenger characteristics, which are correlated to particular portions of content that is consumed through the video display units 100a-n according to various embodiments of the present invention.

The head end content server 10 stores a set of content and is configured to separately deliver content to the VDUs 100a-n responsive to content selection commands separately received from the VDUs 100a-n through a data network 30 and the distribution components 20. The distribution components 20 may include seat electronics boxes 22, each of which can be spaced apart adjacent to different groups of seats, and/or one or more wireless communication routers 24.

Example content that can be downloaded from the head end content server 10 can include, but is not limited to, movies, TV shows, audio programs, application programs (e.g. games, news, etc.), informational videos and/or textual descriptions (e.g., regarding destination cites, services, and products), and advertisements. The wireless router 24 may be a WLAN router (e.g. IEEE 802.11, WIMAX, etc), a cellular-based network (e.g. a pico cell radio base station), etc.

The VDUs 100a-n are connected to the head end content server 10 to request and receive content through wired and/or wireless network connections through the network 30 and/or the distribution components 20. Although only three VDUs 100a-100n and one content server 10 are shown in FIG. 1 for ease of illustration, any number of VDUs and content servers may be used with embodiments herein. Although the metrics computer 40 is illustrated in FIG. 1 as being separate from a VDU, the functionality described herein for a metrics computer may alternatively or additionally be performed by a VDU. Conversely, functionality described herein as being performed by a VDU may additionally or alternatively be performed by a separate metrics computer.

Although the system of FIG. 1 includes a head end content server 10, the vehicle entertainment systems disclosed herein are not limited thereto. The video display units may alternatively be configured to store content in internal/local mass memory for access by users and/or may stream and/or download content from other devices, such as from other video display units (e.g., peer-to-peer sharing) and/or from off-board devices such as ground based content servers accessed via a satellite communication system.

Although embodiments herein are primarily described in the context of an IFE system within an aircraft cabin, the invention is not limited thereto. Instead, the embodiments may be used to provide other types of entertainment systems for trains, automobiles, cruise ships, buses, convention centers, sports arenas, business meeting rooms, home, and other environments. When used in an aircraft, a bus, a train, a meeting room or other environment where seats are arranged in columns, the VDUs 100a-n can be attached to seatbacks so they face passengers/users in adjacent rearward seats. The VDUs 100a-n may alternatively be mounted to bulkheads, movable support assemblies connected to seat armrests and/or seat frames, etc. Embodiments herein may be used with vehicle electronic systems other than entertainments system, such as with vehicle digital signage display systems, etc.

Figure 2:
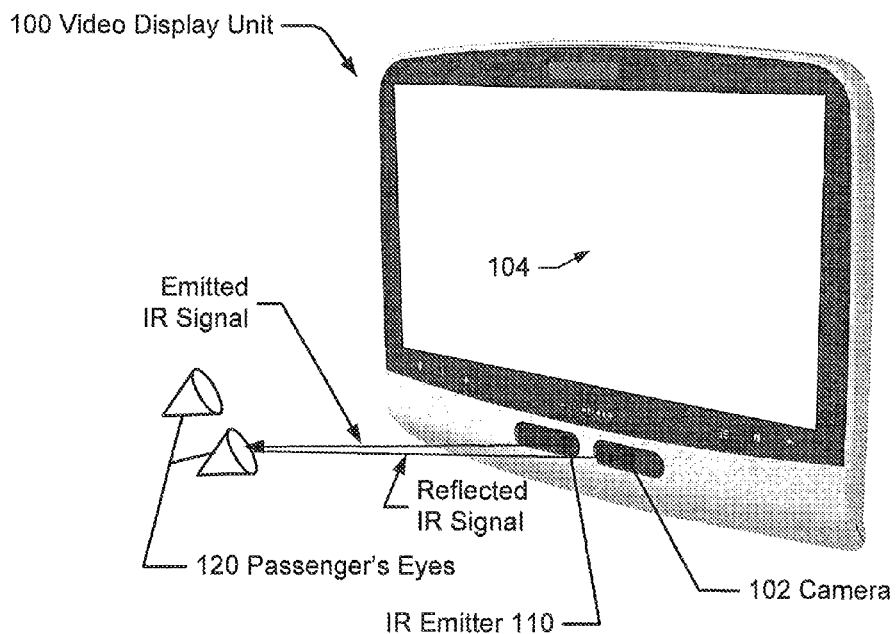
FIG. 2 illustrates a video display unit (VDU) which is configured to determine passenger demographics, emotions, attentiveness, and eye viewing locations on the display according to some embodiments.

FIG. 2 illustrates a VDU 100 having one or more cameras 102 that output a camera signal containing data representing the face of a passenger or other user who is seated in close proximity to the VDU 100. The camera 102 may be any type of sensor that can generate data representing observable characteristics of a passenger. Referring to FIG. 2, the VDU 100 has a display surface 104 configured to display images to a user and which may further display user selectable indicia that a user can select to control various functional operations of the IFE system. The VDU 100 communicates with the metrics computer 40 which is located on-board and/or off-board the aircraft and which can operate to correlate passenger demographics to content usage statistics and to analyze how appealing the content was to those passengers when consumed.

Figure 5:
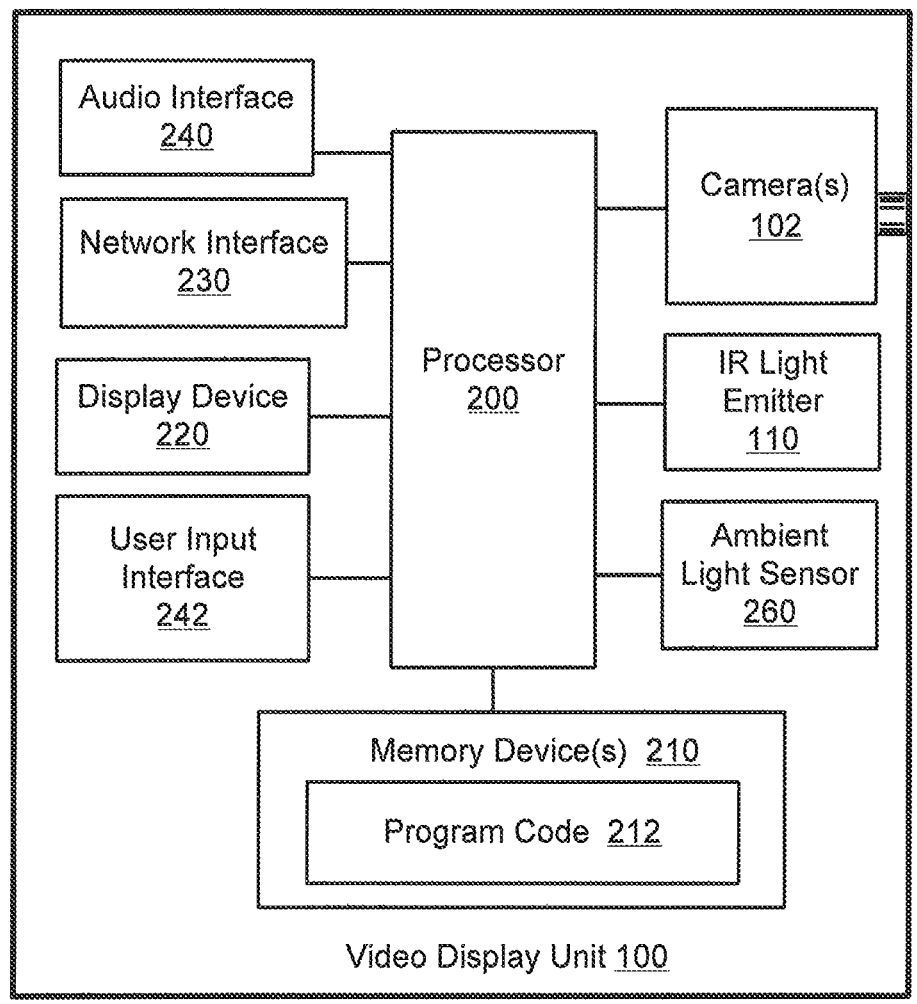
FIG. 5 is a block diagram of components that may be included in the video display unit of FIGS. 1 and 2 and configured to operate according to some embodiments.

FIG. 5 is a block diagram of components that may be included in the VDU 100 configured to operate according to some embodiments. Referring to FIGS. 1, 2, and 4, the VDU 100 includes a processor 200 that processes the camera signal using image detection algorithms (e.g., facial feature expression detection algorithms) and defined rules to identify passenger demographics, passenger emotions, passenger attentiveness, passenger eye viewing locations, and other tracked passenger characteristics, which can are used to generate enhanced content usage metrics. The processor 200 may further operate to correlate the characterization information to particular portions of content that is consumed through the video display units 100a-n, and may generate the enhanced content usage metrics based on correlations determined for particular portions of content that was consumed through the video display units 100a-n. As explained above, consumption of content can include viewing the content (e.g., movie, TV program, textual information, informational video), running an application program (e.g., game), listening to audio programming, etc. Various components of the block diagram of FIG. 5 may also be configured as disclosed herein for use in the metrics computer 40 and/or the central content usage analysis computer 84.

The IFE system can communicate the enhanced content usage metrics through a network interface 50 via a radio interface to a radio access network 80 and/or via a wired connection to a data network 82. The radio access network 80 may include a WLAN transceiver, a WIMAX transceiver, a cellular transceiver (e.g., cellular base station), and/or another a wireless data communication transceiver. The enhanced content usage metrics can be collected by a central content usage analysis computer 84, and combined to generate statistics and other information that, for example, characterizes which content items were consumed during a flight, characteristics of passengers who consumed the content items, and how much passenger attention was given to various portions of the content items.

Figure 6:
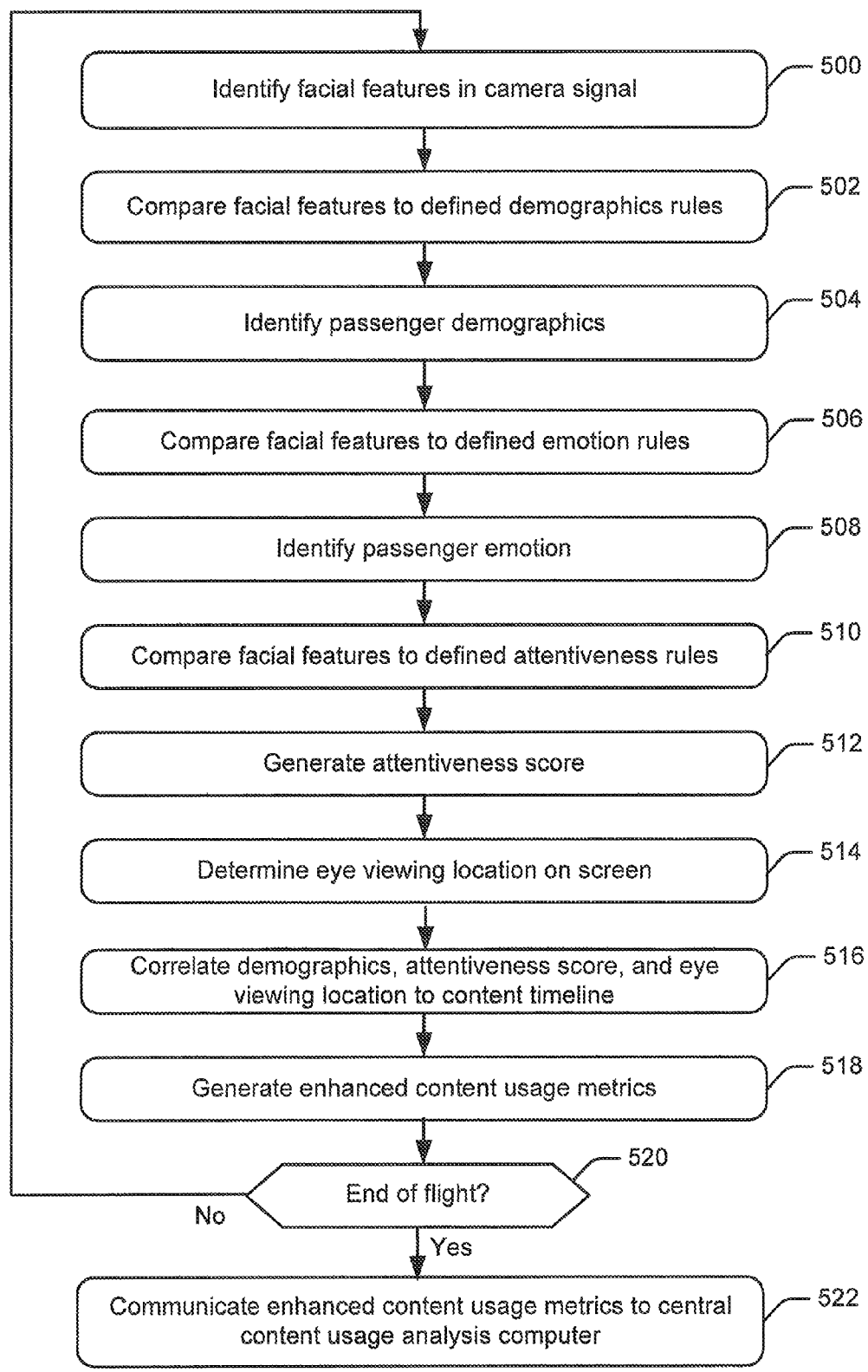
FIG. 6 is a flowchart of operations and methods that may be performed by a processor of the video display unit, another component of the IFE system, and/or the central content usage analysis computer to generate enhanced content usage metrics according to some embodiments.

FIG. 6 is a flowchart of operations and methods that may be performed by a processor of the VDU 100, the metrics computer 40, and/or the central content usage analysis computer 84 to generate enhanced content usage metrics according to some embodiments. A processor (e.g., processor 200) processes the camera signal using facial analysis operations to identify (block 500) facial features, and compares (block 502) the facial features to defined demographics rules. The processor identifies (block 504) user demographics based on the comparison of the facial features to the defined demographics rules. In one nonlimiting example approach, the processor may analyze the camera signal to estimate the passenger's age based on hair color (e.g., presence of gray or color contrasting hair), sensed facial wrinkles or skin tightness, complexion, height, weight, etc. The processor 200 may similarly determine the gender and/or ethnicity of the passenger based on skin color, eye color, etc.

The processor correlates (block 516) the user demographics to a timeline of content consumed by the user through the VDU 100 to generate enhanced content usage metrics. The enhanced content usage metrics can be communicated (block 522) through the network interface 50 for delivery to the central content usage analysis computer 84 when generated by one or more components of the IFE system and upon determining (block 520) that the flight has ended.

In another embodiment the enhanced content usage metrics are generated and used in real time to better engage the passenger with the content, advertisements, crew services, etc. The enhanced content usage metrics may be used by the metrics computer 40 and/or by the VDU 100 to, for example, control advertisements provided to a passenger, control content that is offered to the passenger, control crew services offered to the passenger, etc. The enhanced content usage metrics may be communicated during the flight to the central content usage analysis computer 84.

The processor can be further configured to compare (block 506) the facial features to defined emotion rules, such as by identifying facial expressions that are compared to the emotion rules, to identify (block 508) a user emotion, and to correlate (block 516) the user emotion to the timeline of content consumed by the user through the VDU 100. The enhanced content usage metrics can be generated (block 518) furthermore based on the correlation (block 516) of the user emotion to the timeline of content consumed by the user through the VDU 100. The facial analysis operations performed on the camera signal may identify occurrences of facial expressions that are classified based on the emotion rules as being, for example, neutral, smiling, laughing, sad, bored, sleeping, or surprised.

The processor may correlate changes in emotion to a timeline of the content, such as by correlating identified emotions to a timeline of content dialog or scene changes within content. Changes in emotion may be correlated to introduction or removal of advertisements which may be displayed in-line during commercial breaks in the content or displayed in parallel (e.g., within advertisement bars adjacent to the content, within picture-in-picture windows overlaid on the content, etc.) and/or correlated to tracked locations within advertisement dialogs or advertisement scene changes within content. The correlations may be identified by information included in the enhanced content usage metrics. Thus, for example, the enhanced content usage metrics that are generated can include information scoring an average level of happiness, sadness, boredom, surprise, inattentiveness, etc. exhibited by the passenger during identified scenes and/or times within the content.

The processor can be further configured to compare (block 506) the facial features to defined attentiveness rules, to generate (block 512) an attentiveness score based on the comparison of the facial features to the defined attentiveness rules, and to correlate (block 516) the attentiveness score to the timeline of content consumed by the user through the VDU 100. The enhanced content usage metrics can be generated (block 518) furthermore based on the correlation (block 516) of the attentiveness score to the timeline of content consumed by the user through the VDU 100.

As explained below, the processor may correlate changes in emotion, attentiveness, and/or other passenger characteristics to a timeline, flight phase information, crew services provided to the passenger, etc.

The processor can be further configured to process the camera signal to determine (block 514) an eye viewing location on a display device 220 of the VDU 100, and to correlate (block 516) the eye viewing location to the timeline of content consumed by the user through the VDU 100. The enhanced content usage metrics can be generated (block 518) furthermore based on the correlation (block 516) of the eye viewing location to the timeline of content consumed by the user through the VDU 100. The generated enhanced content usage metrics may more particularly identify particular locations within a timeline of the content that triggered changes in passenger emotion, such as laughing, smiling, surprise, etc. The metrics may indicate whether and how long a passenger looked at an advertisement displayed in a border area to a movie, how long a passenger looked at content of the movie and what content, how long the passenger looked elsewhere while the movie was playing and what content was missed, how long a passenger looked at defined items contained within the movie (e.g., products placed within a movie for advertisement), etc.

In one non-limiting example approach, to determine a location on the display surface 104 where a passenger's eyes 120 are presently directed (focused), the VDU 100 may illuminate the eyes 120 using one or more light emitters 110. In some embodiments, the light emitter 110 can be an infrared (IR) light emitter which can provide advantages over a visible light emitter, including: 1) can be directed toward a person's eyes without annoyance; 2) can be used without disturbing a darkened vehicle environment; 3) provides high reflectively from pupils of eyes; 4) more easily distinguished from other ambient lighting sources in a vehicle environment; and 5) the IR emitter can be increased in intensity to compensate for bright generated light or sunlight within the cabin interior.

The brightness of the light emitter 110 may be controlled by the processor 200 to increase in response to sensing higher levels of ambient light (e.g., sensed via the camera signal or via an ambient light sensor 260 in FIG. 4), and to decrease in response to sensing lower levels of ambient light. Thus, for example, while a user's face is brightly lit by sunlight, the light emitter 110 can be controlled to output a brighter (higher illumination output) light toward the user's face to compensate for the effects on sunlight (e.g., washed out eye's relative to the face within the video signal) and, thereby, enable accurate tracking of the user's eyes.

The emitted IR light is reflected by the eyes 120 (e.g., by the cornea and lens) and returned to the camera 102. The processor 200 can identify a location on the display surface 104 that is being viewed by the person based on a determined angle of the reflected light, and can correlate in time the viewed location on the display surface 104 to locations within a stream of content that is being displayed on the display surface 104. The processor 200 may furthermore identify particular objects or areas being viewed within content. Thus, for example, the processor 200 may determine whether a passenger is viewing an advertisement, flight status information, or other content displayed adjacent to movie content or within a picture-in-picture window and, moreover, may determine how long the passenger's attention was maintained on the advertisement or other content.

Because reporting demographics, emotions, and/or attentiveness for individual passenger may raise privacy concerns under some national laws or industry accepted practices, the processor of the VDU 100, the metrics computer 40, and/or the central content usage analysis computer 84 can be configured to group and combine (e.g., through numerical statistics) the demographics, emotions, and/or attentiveness information from the enhanced content usage metrics for passengers across VDUs 100 during a single flight of the aircraft, multiple flights of the aircraft, and/or across flights by a fleet of aircraft.

The individual metrics for each passenger may be sorted between groups defined based on one or more of: demographics; emotions; attentiveness; etc. The metrics may be further sorted within hierarchical groupings. Combined metrics can be generated based on combinations of metrics within a same grouping. Thus, for example, combined enhanced usage metrics may be generated for male passengers within the age range of 40-49 who watched movies within a defined category, while other enhanced usage metrics may be generated for female passengers within the same age range who watched the same category of movies, and so on.

The groupings may be furthermore performed based on departure city, arrival city, flight duration, time of day, etc. Grouping and combining information from the enhanced usage metrics for numerous passengers can reduce or eliminate such privacy concerns.

The processor of the metrics computer 40 and/or the central content usage analysis computer 84 can be configured to use the enhanced usage metrics to determine the passengers' reactions to scenes of a movie or other content, effectiveness of paid product placement within a movie or other content, engagement retention level of the passengers to the movie or other content, stress level of the passengers during a flight timeline as explained below, effectiveness of in-line and/or off-advertisements, and other analysis it can provide a more thorough understanding of how passengers consumed content during a flight and how appealing the content was to those passengers.

Figure 3:
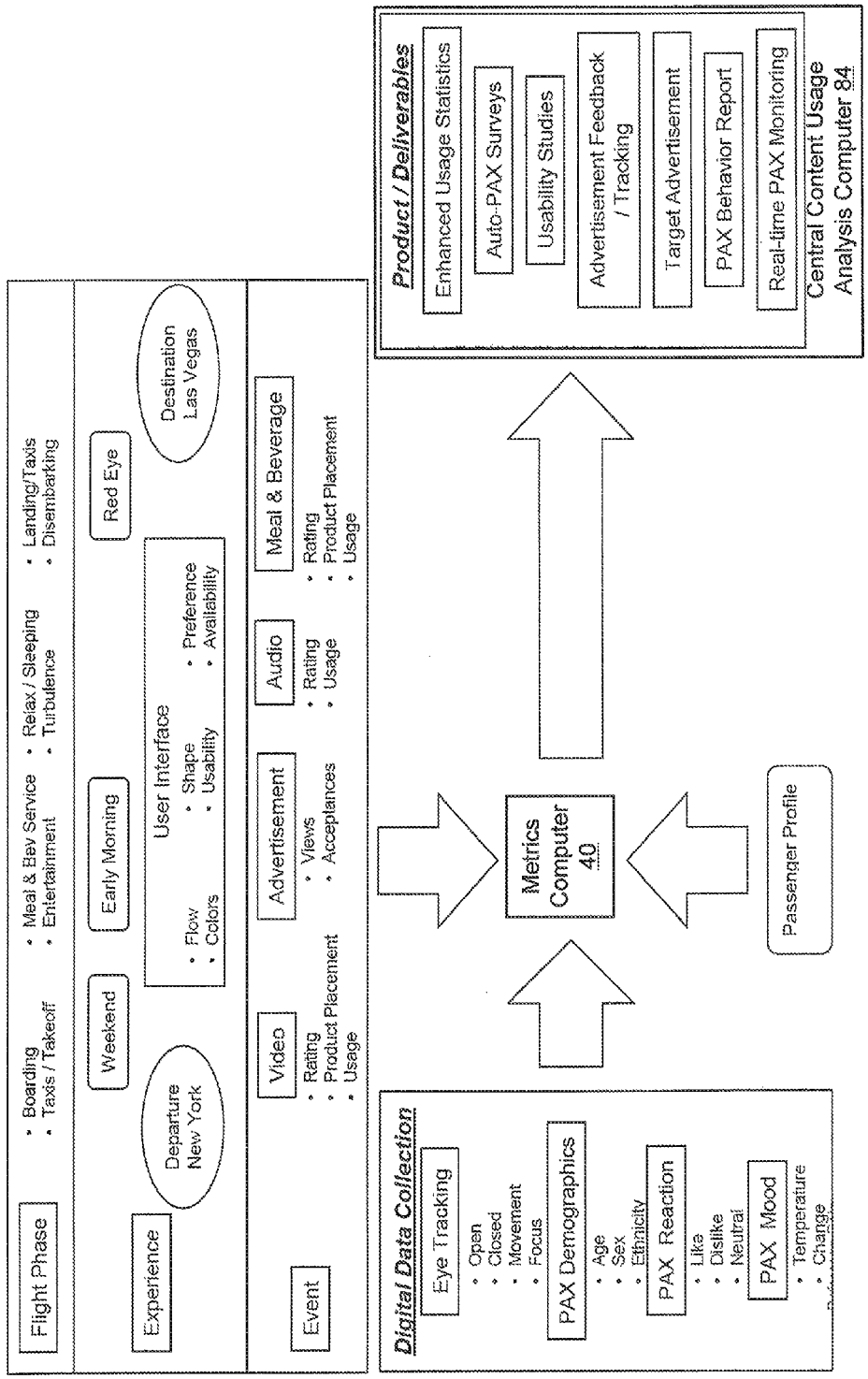
FIG. 3 illustrates example informational that can be input to a metrics computer for analysis and example products/deliverables that can be generated by a central content usage analysis computer and/or by the metrics computer according to some embodiments.

FIG. 3 illustrates example informational that can be input to the metrics computer 40 for analysis and example product/deliverable outputs that can be generated by the central content usage analysis computer 84 and/or by the metrics computer 40 according to some embodiments.

Referring to FIG. 3, the metrics computer 40 can determine passenger ("PAX") demographics, emotions, attentiveness, and other passenger information based on analysis of the passenger's facial features and/or other information that can be sensed regarding the passenger. Moreover, the metrics computer 40 can be connected to an information network of the aircraft to obtain environmental information regarding what the passenger experiences before takeoff, during flight, and after landing.

The metrics computer 40 can collect eye tracking information (e.g., indication of eyes open, eyes close, viewed locations, etc.), passenger demographics information (e.g., age, sex, ethnicity, etc.), passenger reaction information (e.g., likes, dislikes, neutral reactions, etc.), and passenger mood. The metrics computer 40 can receive environmental and/or timing information which can include flight phase information, flight itinerary information, and/or external events that may be separate from the video display unit 100.

Flight phase information may include one or more of boarding phase, departure taxi phase, take off phase, cruise phase, landing phase, arrival taxi phase, and disembarking phase. Flight itinerary information may include one or more of the departure city, the destination city, departure time, arrival time, and flight duration. The external events may include one or more of providing food (e.g., meal and/or beverage) service, crew announcements to passengers, occurrence of aircraft turbulence, and other events that may affect a passenger's attentiveness to content displayed on the video display unit 100 and/or satisfaction with the overall experience. Internal events may include rating information for content consumed through the video display unit 100, identification of content consumed, identification of advertisements displayed, identification of user interaction with one or more of the advertisements, passenger feedback regarding the content consumed through the video display unit 100, passenger feedback regarding the advertisements displayed through the video display unit 100, passenger feedback regarding the food service, passenger feedback regarding crew service, and passenger feedback regarding other defined characteristics of the flight service.

The metrics computer 40 can receive passenger profile information which can include information obtained during a registration process for the passenger and/or learned from earlier observation of the passenger (e.g., recordation of passenger preferences and/or characteristics). The passenger profile information may characterize known facial features of the passenger which can be based on learning operations performed during previous observations of the passenger and/or based on passenger demographics information. The metrics computer 40 can use the profile information when identifying the user demographics based on comparison of the facial features to defined demographics rules. For example, the passenger's known/estimated age, sex, and/or ethnicity may be used to improve the determination of passenger mood and/or attentiveness relative to threshold values that are set based on defined groupings of passenger demographics.

The metrics computer 40 generates enhanced content usage metrics based on this and/or other information shown in FIG. 3, and communicates the enhanced content usage metrics to the central content usage analysis computer 84. The usage analysis computer 84 processes the enhanced content usage metrics to: 1) generate enhanced usage statistics information; 2) automatically generate passenger survey feedback information (e.g., generate survey information indicating a passenger's mood and/or attentiveness during different portions of a movie consumed through the video display unit 100); 3) generate passenger usability study information (e.g., identification of passenger usage of VDU content and/or other services during flight); 4) advertisement feedback and tracking information; 5) targeted advertisement information (e.g., control selection of advertisements to be presented to a particular passenger and/or to passengers having defined demographics); 6) passenger behavior reports; and/or 7) real-time passenger monitoring.

Some or all of the functionality described herein for the central content usage analysis computer 84 may alternatively be performed by the metrics computer 40. Thus for example, advertisements can be optimally targeted to a particular passenger by controlling timing for when advertisements are displayed, controlling duration of advertisements displayed, controlling selection of which advertisements are displayed, etc., based on the enhanced content usage metrics that are generated for the passenger. Some usage cases can include not displaying advertisements while the passenger is looking away from the video display unit 100, controlling the duration of advertisements based on the passenger's mood and/or determined level of attentiveness, selecting among available advertisements for display to a passenger based on the observed user's reaction to one or more earlier displayed advertisements, etc.

FIG. 4 is an example data structure containing enhanced content usage metrics according to some embodiments. Referring to FIG. 4, the data structure may be generated by the metrics computer 40 and/or by the central content usage analysis computer 84. The enhanced content usage metrics that are included in the data structure can be a timeline of one or more items of content (e.g., Content 1, Content 2, Advertisement, Information, etc.) that are consumed through a VDU 100 overlapping in time (simultaneously). The metrics can include passenger demographics, passenger emotion, passenger attentiveness, and passenger eye viewing locations which can be logically associated with various points in the content timeline(s) to enable correlation between the information being determined for the passenger and the content being consumed. Correlations may be performed in near-real-time by the VDUs 100 and/or the metrics computer 40. Alternatively, the correlations may be performed following completion of a flight by the central content usage analysis computer 84.

Figure 7:
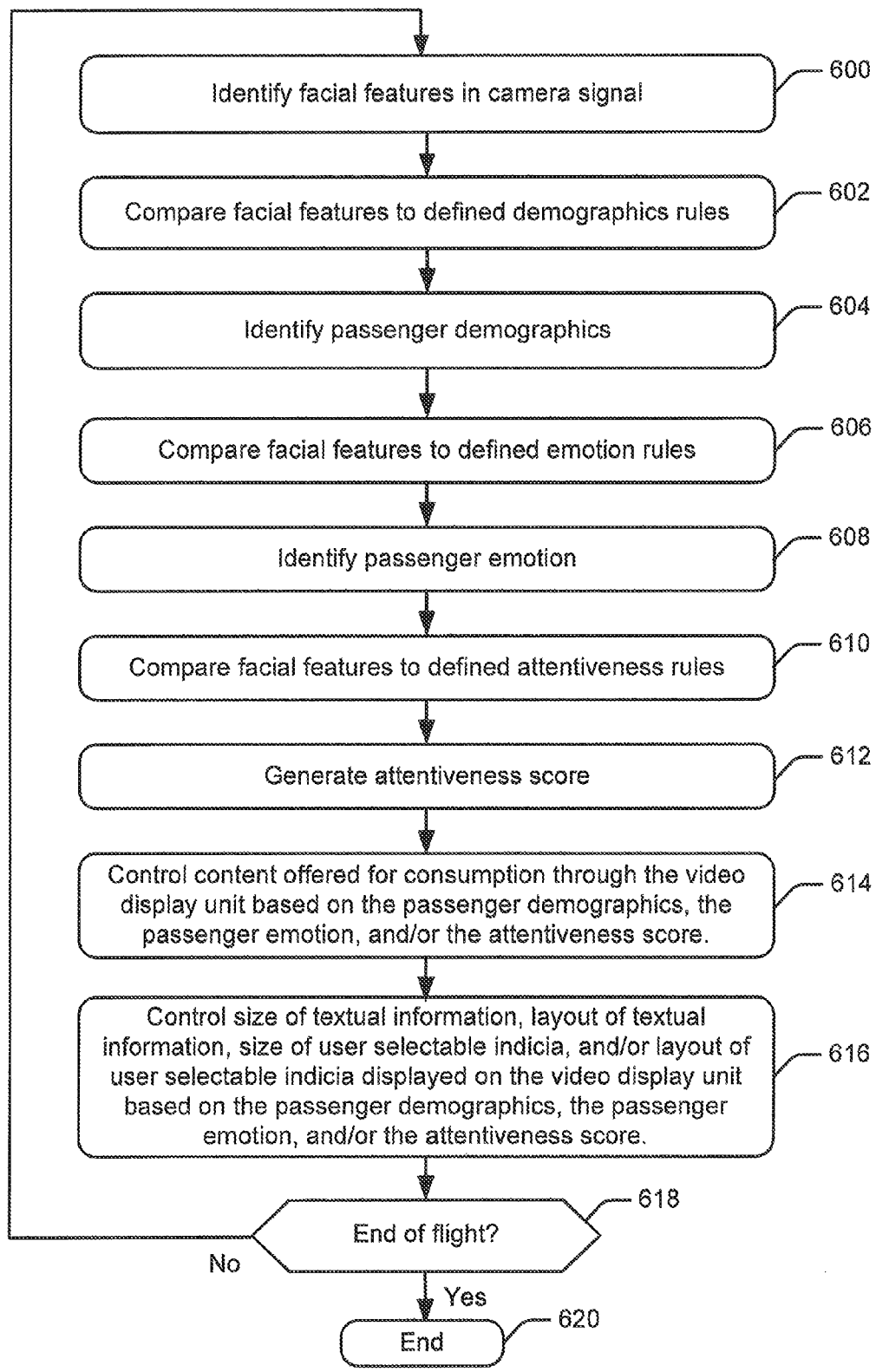
FIG. 7 is a flowchart of operations and methods that may be performed by a processor of a VDU and/or a metrics computer to control size of textual information, layout of textual information, size of user selectable indicia, and/or layout of user selectable indicia displayed on a VDU, and/or to control what content is made available from the head end content server for consumption through the VDUs.

FIG. 7 is a flowchart of operations and methods that may be performed by a processor of the VDU 100 and/or the metrics computer 40 to control size of textual information, layout of textual information, size of user selectable indicia, and/or layout of user selectable indicia displayed on a VDU 100, and/or to control what content is made available from the head end content server 10 for consumption through the VDUs 100 according to some embodiments. As will be explained further below, the processor may use the passenger demographics, passenger emotion, and/or attentiveness to control what content is made available from the head end content server 10 for consumption through one of the VDUs 100 being operated by that passenger.

Referring to FIG. 7, the processor processes the camera signal using facial analysis operations to identify (block 600) facial features, and compares (block 602) the facial features to defined demographics rules. The processor identifies (block 604) user demographics based on the comparison of the facial features to the defined demographics rules. The processor may analyze the camera signal to estimate the passenger's age based on hair color (e.g., presence of gray or color contrasting hair), sensed facial wrinkles or skin tightness, complexion, height, weight, etc. The processor 200 may similarly determine the gender and/or ethnicity of the passenger based on skin color, eye color, etc.

The processor may alternatively or additionally compare (block 606) the facial features to defined emotion rules, and identify (block 608) a passenger emotion based on the comparison of the facial features to the defined emotion rules. Processor may still alternatively or additionally compare (block 610) the facial features to defined attentiveness rules, and generate (block 612) an attentiveness score based on the comparison.

The processor can control (block 614) what content is offered for consumption through the VDU 100 based on the passenger demographics, passenger emotion, and/or attentiveness. For example, the processor may filter a set of content stored on the content server 10 to generate a filtered list based on the determine user demographics, passenger emotion, and/or attentiveness, and communicate the filtered list of available content to the VDU 100 for display to that passenger. Thus, the content made available to a passenger can be filtered based on an estimate of the passengers age and/or emotion. Passengers who exhibit a threshold level of attentiveness or, alternatively, less than a threshold level of attentiveness, may be provided an expanded variety of content consumed through their respective VDUs 100.

The processor can control (block 616) size of textual information, layout of information, and/or size of user selectable indicia displayed on the display device 220 of one of the VDUs 100 based on the passenger demographics, the passenger emotion, and/or the attentiveness score. For example, the processor may determine a size or layout of information to be displayed on the VDU 100 responsive to an estimate of the passenger's age. For example, passengers having an age beyond a threshold value may be displayed text or indicia having a greater minimum size and/or less graphically complex screen layouts than younger passengers, or vice versa. Similarly, passengers who are exhibiting tiredness or inattentiveness may be displayed text or indicia having a greater minimum size than younger passengers and/or less graphically complex screen layouts than passengers not exhibiting those identifiable conditions, or vice versa.

The processor can modify operational flows allowed between hierarchical layers of user selectable indicia displayed by the video display unit 100 based on the passenger demographics, the passenger emotion, and/or the attentiveness score. For example, the menus presented to passengers and/or menu selections by passengers for triggering operational flows may be simplified for passengers who are estimated be younger or older than a threshold age. Passengers within a defined age range may be provided more menu options for more advanced functionality of the video display unit 100, while other passenger outside the defined age range may be precluded from accessing such advanced functionality.

Figure 8:
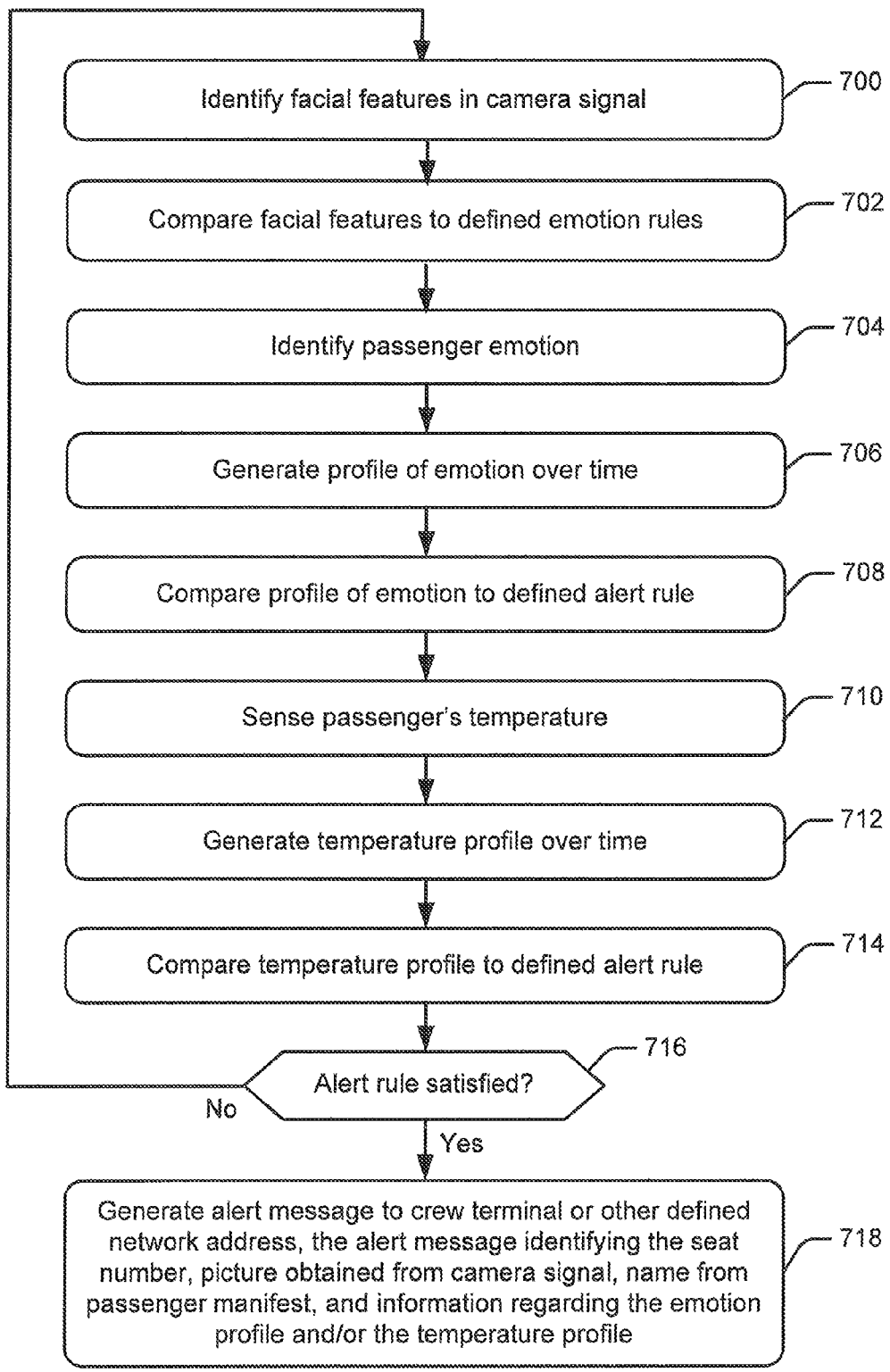
FIG. 8 is a flowchart of operations and methods that may be performed by a processor of a VDU and/or a metrics computer to generate an alert message based on a determined passenger emotion profile and/or based on a determined passenger temperature profile according to some embodiments.

FIG. 8 is a flowchart of operations and methods that may be performed by a processor of the VDU 100 and/or the metrics computer 40 to generate an alert message based on a determined passenger emotion profile and/or based on a determined passenger temperature profile according to some embodiments.

Referring to FIG. 8, the processor processes the camera signal using facial analysis operations to identify (block 700) facial features, and compares (block 702) the facial features to defined emotion rules. The processor identifies (block 704) the passengers emotion based on the comparison of the facial features to the defined emotion rules. The processor generates (block 706) a profile of the user emotions repetitively identified over time. The processor compares (block 708) the profile of the passenger emotions to a defined alert rule.

The processor may alternatively or additionally be configured to process the camera signal to sense (block 710) a temperature of the user's face, to generate (block 712) a profile of the temperatures repetitively determined for the passenger over time, and to compare (block 714) the profile of the temperatures to the defined alert rule (which may identify onset of sickness, heightened anger or anxiety, etc.).

The processor determines (block 716) whether the alert rule is satisfied. When satisfied, the processor generates and communicates communicate an alert message to an electronic terminal having a defined network address. The electronic terminal may be a crew terminal, so that the alert message operates to notify the crew of a passenger who needs assistance or who may be exhibiting behavior that additionally presents a risk to other passengers, the crew, or the passenger. The alert message may be communicated off-board aircraft to a network node that may be operated by the airline or government authorities.

When generating the alert message, the processor may determine a seat number of the user, and embed the seat number in the message that is communicated. The processor may search a passenger manifest using the seat number to obtain a name of the user, and embed the name in the message that is communicated. The processor obtain a picture from the camera signal, and embed the picture in the message that is communicated. The alert messages may be encrypted and/or password protected to satisfy privacy concerns that may arise and to avoid inadvertent disclosure to unintended crew members and/or passengers.

Referring again to FIG. 5, further components that may be included within the video display unit 100, the metrics computer 40, and/or the central content usage analysis computer 84 are further explained. The components can further include memory device(s) 210 containing program code 212, an audio interface 240, the user input interface 242 (e.g., touch screen interface, switches, control wheels, buttons, keypad, keyboard, etc.), and a wired or wireless network interface 230. The network interface 230 may include a wired networking device (e.g., Ethernet circuit) and/or may include one or more wireless communication transceiver devices (e.g., 3GPP Long Term Evolution (LTE), WLAN (IEEE 802.11), WiMax, Bluetooth, etc.)

The processor 200 includes one or more data processing circuits, such as a general purpose and/or special purpose processor (e.g., microprocessor and/or digital signal processor). The processor 200 is configured to execute the program code 212 in the memory device(s) 210, described below as a computer readable medium, to perform some or all of the operations and methods that are described herein for one or more of the embodiments.

The processor 200 may receive music, video, games, data, and application programs which it processes for display on the display device 220 and/or for output as audio through the audio interface 240 to, for example, a headphone jack attached to an armrest of the seat. The music, video, games, data, and application programs may be received from the network connected content server 10 that is configured to respond to on-demand requests generated by the user through selection of displayed indicia, which can be identified by the processor 200 tracking the user's viewing location and/or responsive to user selections via the user input interface 242.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in, a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed:

1. A vehicle entertainment system comprising:
   a plurality of video display units configured to be mounted to fixed surfaces within a vehicle, wherein each of the video display units comprises:
   a display device configured to provide content to a user;
   a camera configured to output a camera signal containing data representing the user's face; and
   a processor configured to process the camera signal to identify facial features, to compare the facial features to defined demographics rules, to identify user demographics based on the comparison of the facial features to the defined demographics rules, to correlate the user demographics to a timeline of content consumed by the user through the video display unit to generate enhanced content usage metrics, to process the camera signal to determine an eye viewing location on a display device of the video display unit, and to correlate the eye viewing location to the timeline of content consumed by the user through the video display unit to further generate the enhanced content usage metrics;
   a communication interface configured to communicate with a central content usage analysis computer; and
   a metrics computer within the vehicle, the metrics computer is communicatively connected to determine the departure city and/or flight duration, to receive the enhanced content usage metrics from the video display units, to combine the enhanced content usage metrics with the departure city and/or the flight duration to generate anonymized enhanced content usage metrics through numerical statistics that hide individual values of the received enhanced content usage metrics, and to communicate the anonymized enhanced content usage metrics from the vehicle through the communication interface for delivery to the central content usage analysis computer separately located from the vehicle.

2. The vehicle entertainment system of claim 1, wherein: the processor is further configured to compare the facial features to defined attentiveness rules, to generate an attentiveness score based on the comparison of the facial features to the defined attentiveness rules, and to correlate the attentiveness score to the timeline of content consumed by the user through the video display unit to generate the enhanced content usage metrics.

3. The vehicle entertainment system of claim 1, wherein: the processor is within a metrics computer connected to the content server, the processor is communicatively connected to the video display units to receive the camera signals, and for each of the video display units the processor processes the camera signal from the video display unit to identify facial features of the user, compares the facial features to defined demographics rules, identifies user demographics based on the comparison of the facial features to the defined demographics rules, correlates the user demographics to a timeline of content consumed by the user through the video display unit to generate the enhanced content usage metrics for the video display unit, combines the enhanced content usage metrics generated for the video display units to generate combined enhanced content usage metrics, and communicates the combined enhanced content usage metrics as the enhanced content usage metrics through the communication interface for delivery to the central content usage analysis computer.

4. The vehicle entertainment system of claim 1, wherein: the processor is further configured to determine from the eye viewing location on the display device of the video display unit an elapsed time for how long the user looked at an advertisement displayed in a border area to a movie that is displayed through the video display unit and to further generate the enhanced content usage metrics to indicate the elapsed time correlated to the timeline of the movie.

5. The vehicle entertainment system of claim 1, wherein:
the processor is further configured to determine from the eye viewing location on the display device of the video display unit an elapsed time for how long the user looked away from a movie consumed through the video display unit and to further generate the enhanced content usage metrics to indicate the elapsed time correlated to the timeline of the movie.

6. The vehicle entertainment system of claim 1, wherein:
the processor is further configured to determine from the eye viewing location on the display device of the video display unit an elapsed time for how long the user looked at a defined item contained within a movie consumed through the video display unit and to further generate the enhanced content usage metrics to indicate the elapsed time correlated to the timeline of the movie.

7. The vehicle entertainment system of claim 1, wherein:
the processor is further configured to process the camera signal to determine the eye viewing location on the display device of the video display unit based on determining an angle of infrared light incident to the camera that is reflected from the user's eyes which are illuminated by one or more infrared light emitters connected to the video display unit.

8. The vehicle entertainment system of claim 7, wherein:
the processor is further configured to control brightness of infrared light emitted by the one or more infrared light emitters responsive to sensing a level of ambient light.

9. The vehicle entertainment system of claim 8, wherein:
the processor is further configured to increase brightness of the infrared light emitted by the one or more infrared light emitters responsive to sensing a higher level of ambient light, and to decrease brightness of the infrared light emitted by the one or more infrared light emitters responsive to sensing a lower level of ambient light.

10. The vehicle entertainment system of claim 9, wherein:
the processor is further configured to increase brightness of the infrared light emitted by the one or more infrared light emitters responsive to sensing through the camera signal that the user's face is brightly lit by sunlight.

11. The vehicle entertainment system of claim 1, wherein:
the processor is configured to estimate the user's age based on the user demographics, and to control a size or layout of information that is displayed by the video display unit based on the user's age that is estimated.

12. The vehicle entertainment system of claim 11, wherein:
the processor is configured to increase a minimum size of text or user selectable indicia that is displayed by the video display unit responsive to the user's age that is estimated being greater than a defined threshold value.

13. The vehicle entertainment system of claim 1, wherein:
the processor is configured to identify when the user is exhibiting tiredness or inattentiveness toward content displayed by the video display unit based on the facial features that are identified, and respond to the identification of tiredness or inattentiveness by increasing a minimum size of text or indicia that is displayed by the video display unit.

14. The vehicle entertainment system of claim 1, wherein:
the processor is configured to identify when the user is exhibiting tiredness toward content displayed by the video display unit based on the facial features that are identified, and to control the video display unit to display more user selectable menu options for more advanced functionality of the video display unit responsive to when the processor does not identify tiredness, and to control the video display unit to display less of the user selectable menu options responsive to when the processor does identify tiredness.

15. The vehicle entertainment system of claim 1, wherein:
The processor is configured to determine from the camera signal a level of attentiveness being exhibited by the user, to compare the level of attentiveness to a threshold level of attentiveness, and to selectively include an expanded variety of the available content in the filtered list of available content depending upon an output of the comparison.

* * * * *